United States Patent [19]

Jeong

[11] Patent Number: 5,419,547
[45] Date of Patent: May 30, 1995

[54] METHOD FOR CONTROLLING TRANSMISSION PAPER FEED OF A FACSIMILE

[75] Inventor: Seok J. Jeong, Seoul, Rep. of Korea

[73] Assignee: Goldstar Co., Ltd., Seoul, Rep. of Korea

[21] Appl. No.: 121,478

[22] Filed: Sep. 16, 1993

[30] Foreign Application Priority Data

Sep. 17, 1992 [KR] Rep. of Korea ............... 1992-16899

[51] Int. Cl.$^6$ .......................................... B65H 7/12
[52] U.S. Cl. ................................. 271/263; 271/265
[58] Field of Search ............... 271/110, 111, 263, 265

[56] References Cited

U.S. PATENT DOCUMENTS 4,331,328  5/1982  Fasig ........................... 271/111 X
5,076,567  12/1991  Sasaki .......................... 271/111 X Primary Examiner—David H. Bollinger
Attorney, Agent, or Firm—Morgan & Finnegan

[57] ABSTRACT

This invention relates to a method for controlling transmission paper feed of facsimiles which includes a first sensor for detecting the presence of paper placed, a second sensor for detecting a paper front of the paper to be transferred and a contact image sensor for reading in contents of the paper to be transferred, comprising the steps of calculating actual transfer distance of the paper which has been transferred from the first sensor to the second sensor after taking slippage into account, determining the actual transfer distance of the paper which will be transferred from the second sensor to the contact image sensor accordance with the calculated value, and transferring the paper from the second sensor to the contact image sensor for the determined distance.

4 Claims, 3 Drawing Sheets

METHOD FOR CONTROLLING TRANSMISSION PAPER FEED OF A FACSIMILE

FIELD OF THE INVENTION

Background of the Invention

This invention relates to facsimiles, more particularly to a method for controlling transmission paper feed.

Generally, as shown in FIG. 1, a transmission paper feed control device of a facsimile includes a paper rest 2 for placing transmission paper 1 thereon, a transfer control lever 3 for separating the placed transmission paper, a transfer control cradle 4 for supporting the transfer control lever 3, a springy transfer control member 5 for putting preset pressure on the transfer control cradle 4, a paper sensor 6 for detecting the presence of the paper on the paper rest 2, a transfer control roller 7 for transferring the paper detected by the sensor 6, a paper front sensor 8 for detecting the paper front of the paper to be transferred by the transfer control roller 7, a scan roller 9 for transferring the paper detected by the paper front sensor 8, and a contact image sensor 10 for reading in the contents of the paper being transferred by the scan roller 9. The unexplained designations of 11 is a springy member, 12 is an upper lid of transmission part and 13 is a lower lid of transmission part.

In the aforementioned conventional transmission paper feed control device as shown in FIG. 2, on detection of the presence of the paper 1 on the paper rest 2 by the paper sensor 6 (step S1), an operator is allowed to press print keys or communication keys (steps S2), which actuates to rotate transfer control roller 7 thereby to transfer the paper (step S3).

If the paper front of the paper being transferring is not detected by the paper front sensor 8, even though the transferred length of the paper exceed 4 times of S10 (steps S4 and S5) which is the distance between the paper sensor 6 and the paper front sensor 8, the device is provided to judge that the paper has been jammed thereby to stops the operation of the device while indicating paper jam on a indicating part (not shown) (step S6). If the paper front is detected by the paper front sensor 8 during the transfer of the paper (step S4), the paper is transferred for the distance S20 from the paper front sensor 8 to the contact image sensor 10 (step S7) while the contact image sensor 10 reads in the contents of the paper (steps S8 to S10).

When the aft end of the paper has been passed the paper front sensor 8, the sensor 8 judges that reading in of the paper has been finished by the contact image sensor 10 thereby stops all operations (steps S11 to S13). If the aft end of the paper has not been passed the paper front sensor 8, the sensor 8 judges that reading in of the paper has not been finished by the contact image sensor 10 thereby leaves the scan roller 9 to continue transfer of the paper.

However, In aforementioned method of transmission paper feed control of a facsimile, the equations of S1=S10 and S2=S20 can not be established due to the slip between the paper 1 and the transfer control roller 7 developed at the transfer control lever 3, but it will be always S1>S10 and S2>S20 making errors that much, where S1 is the actual transfer length of the paper during the paper transfer for the distance S10 from the paper sensor 6 to the paper front sensor 8 and S2 is the actual transfer length of the paper during the paper transfer for the distance S20 from the paper front sensor 8 to the contact image sensor 10. Further the distances S10 and S20 varies depending on the thickness and the properties of the paper. Consequently, there has been problem of inconsistency between the positions of the paper read in and the paper front.

SUMMARY OF THE INVENTION

The object of this invention is to provide a method for controlling transmission paper feed which is adapted to compensate for the errors arisen from the slippage during the transfer of paper by calculating the amount of slip and adjusting the slippage as much.

This and the other object of this invention can be achieved by providing a method for controlling transmission paper feed of facsimiles which includes a first sensor for detecting the presence of paper placed, a second sensor for detecting a paper front of the paper to be transferred and means for reading in contents of the paper to be transferred, comprising the steps of:

calculating actual transfer distance of the paper which has been transferred from the first sensor to the second sensor after taking slippage into account.

determining the actual transfer distance of the paper which will be transferred from the second sensor to the reading means in accordance with the calculated value, and transferring the paper from the second sensor to the reading means for the determined distance.

DETAILED DESCRIPTION OF THE INVENTION

Figure 1:
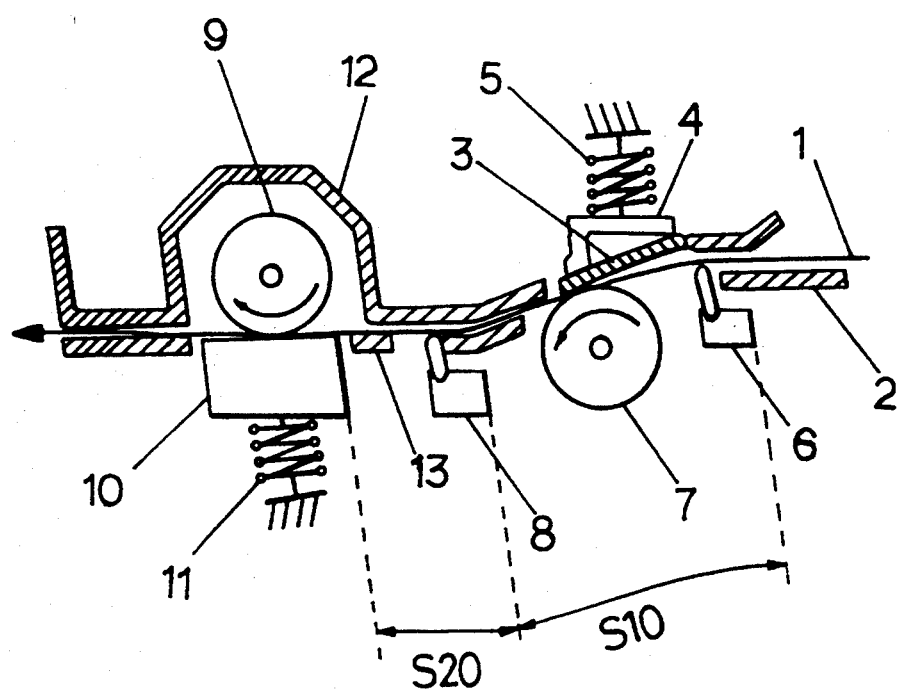
FIG. 1 is a schematic sectional drawing of a transmission paper feed control device of a facsimile.
Figure 2:
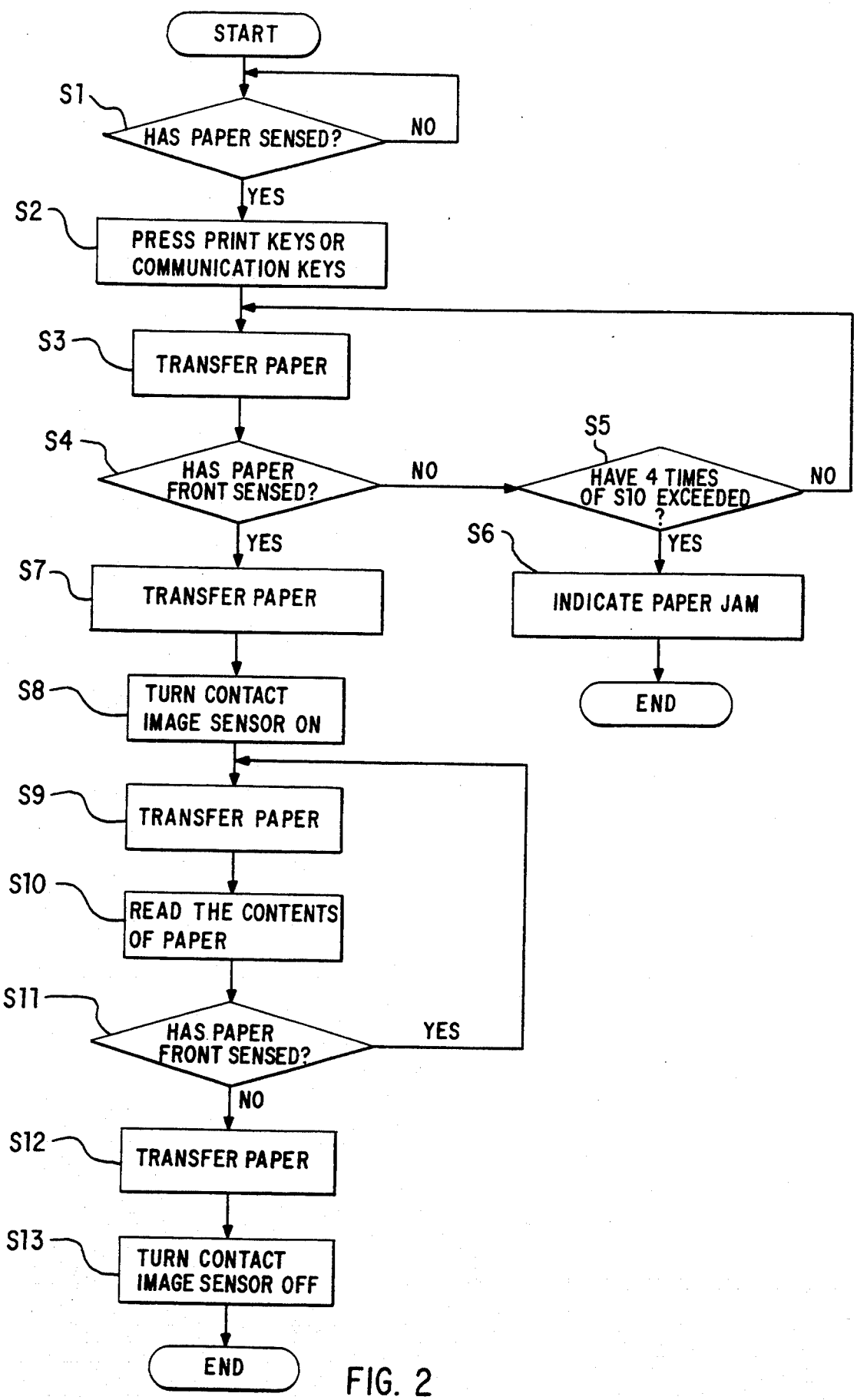
FIG. 2 is a flow chart showing a method for controlling the conventional transmission paper feed referring to the device shown in FIG. 1.
Figure 3:
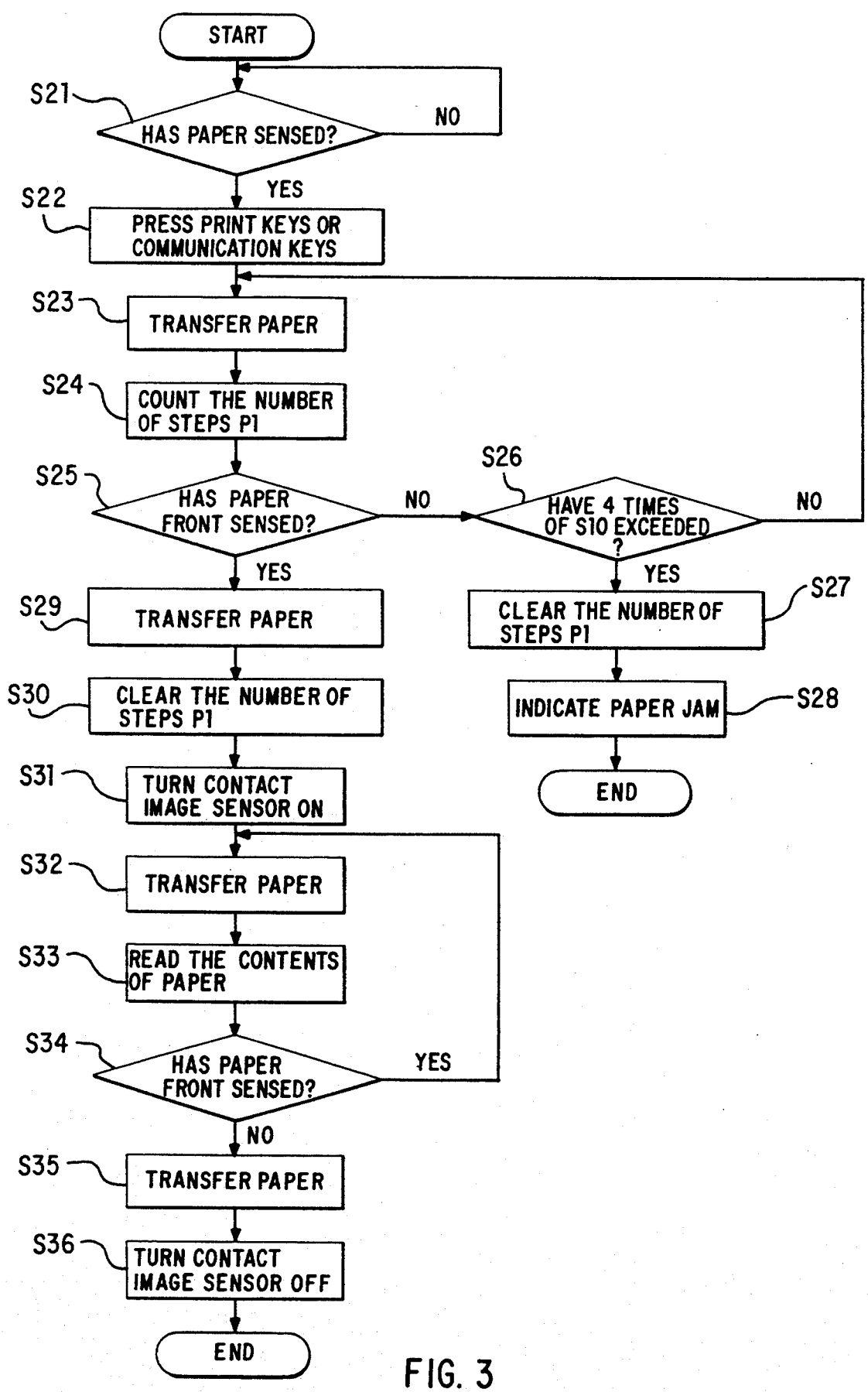
FIG. 3 is a flow chart showing a method for controlling transmission paper feed in accordance with this invention referring to the device shown in FIG. 1.

FIG. 3 is a flow chart showing the method for controlling transmission paper feed in accordance with this invention referring to the device shown in FIG. 1.

On detection of the presence of paper 1 on a paper rest 2 by a paper sensor 6 (step S21), an operator is allowed to presses print key of communication key (step S22), which actuates to rotate a transferring control roller 7 thereby transfer paper (step S22). The number of steps P1 until the paper front sensor 8 detects the paper front is counted (step S24).

When transferring the paper while counting the number of steps P1, if the paper front sensor 8 has not detected the paper front (step S25), the device judges whether the transferred paper length has exceeded 4 times of the distance S10 between the paper sensor 6 and the paper front sensor 8 (step S26). If exceeded, the counted steps P1 during paper transfer is cleared and the operation is stopped while indicating paper jam (steps S27 and S28). If not exceeded, counting of the number P1 of steps and transferring of the paper are continued while continuing the detection of the paper front at the paper front sensor 8 (steps S23 to S25).

When the paper front is detected by the paper front sensor 8 (step S25), the paper is provided to be transferred by the amount S2 calculated by following equation (step S29)

$$S2 = \frac{P1}{P10} \times S20 \quad (1)$$

Where S2 is the transfer distance of the roller while transferring the paper from the paper front sensor 8 to the contact image sensor 10, S20 is the theoretical transfer distance of the paper from the paper front sensor 8 to the contact image sensor 10 without sip between the paper and the roller, P10 is the theoretical number of steps to be taken without slip in transferring the paper from the paper sensor 6 to the paper front sensor 8 and P1 is the actual number of steps taken during the transfer of the paper from the paper sensor 6 to the paper front sensor 8.

Thereafter, the number of step is cleared (step S30) and the contact image sensor 10 is turned on to read in the contents of the paper (steps S31 to S33).

If the aft end of the paper has been detected by the paper front sensor 8 (step S34) during the continuous transfer of the paper by the scan roller 9, then the paper is transferred for the distance of actual transfer S2 from the paper front sensor 8 to the control image sensor 10 (step S35) thereby the contact image sensor 10 completes to read in the contents of the paper, which leads the device to stop all the operations (step S36).

The ratio R of the numbers of steps between the actual transfer step P1 and the theoretical transfer step P10 in transfer of the paper for the distance S10 from the paper sensor 6 to the paper front sensor 8 can be expressed as follows.

$$R = P1/P10 (= S1/S10) \quad (2)$$

Where, S1 is the actual transferred length of the paper during the paper transfer from the paper sensor 6 to the paper front sensor 8 and S10 is the theoretical paper transfer distance between the paper sensor 6 to the paper front sensor 8.

by the equation (2), the equation (1) can be expressed as follows.

$$S2 = R + S20$$

Thus, in transferring the paper for the distance S20 from the paper front sensor 8 to the contact image sensor 10, exact match of the paper front with the read in starting point of the contact image sensor 10 can be achieved by compensating the error which has been arisen from the amount of slip in transferring the paper for the distance S10 between the paper sensor 6 and the paper front sensor 8 through multiplying the R to the theoretical paper transfer distance S20.

Therefore, it becomes possible to in accordance with this invention to improve the reliability of products and to transmit the contents exactly by preventing the defective paper front sensing.

As explained hereinbefore, this invention permits the exact detection of the paper front of the transferring paper by compensating the error as much as the amount which has been arisen from the slip between the paper and the roller in transferring the paper.

Further it becomes possible to in accordance with this invention to improve the reliability of products and to transmit the contents exactly by preventing the defective paper front sensing.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A method for controlling transmission paper feed of facsimiles which includes a first sensor for detecting the presence of paper to be transferred, a second sensor for detecting a paper front of the paper transferred via a first roller a first distance between the first and second sensors, and a means for reading in contents of the paper transferred via a second roller a second distance between the second sensor and the means for reading, comprising the steps of:

determining a first transfer distance of the first roller which has transferred the paper from said first sensor to said second sensor including slippage of the paper, determining a second transfer distance of the second roller for transferring the paper from said second sensor to said reading means response to the first transfer distance, and transferring the paper from said second sensor to said reading means according to the second transfer distance.

2. A method for controlling transmission paper feed as claimed in claim 1, wherein the second transfer distance of the second roller may be expressed in following equation $$S2 = \frac{S1}{S10} \times S20$$

where S2 is actual transfer distance of the second roller which will transfer the paper from said second sensor to said reading means, S1 is actual transfer distance of the first roller which has transferred the paper from said first sensor to said second sensor including the slippage, S10 is a theoretical transfer distance of the paper from said first sensor to said second sensor without the slippage and, S20 is a theoretical transfer distance of the paper from said second sensor to said reading means without slippage.

3. A method for controlling transmission paper feed of facsimiles which includes a first sensor for detecting a paper front of paper being transfered and means for reading in contents of the paper being transfered, comprising the steps of:

counting number of driving steps according to a first transfer distance of a first roller which has transferred the paper from said first sensor to said second sensor including slippage of the paper, determining a second transfer distance of a second roller for transferring the paper from said second sensor to said reading means response to the first transfer distance and transferring the paper from said second sensor to said reading means according to the second transfer distance.

4. A method for controlling transmission paper feed as claimed in claim 3, wherein the second transfer distance may be expressed in the following equation $$S2 = \frac{P1}{P10} \times S20$$

where, S2 is an actual transfer distance of the second roller which will transfer the paper from said second sensor to said reading means, P1 is actual number of steps which has been taken during transfer of the paper from said first sensor to said second sensor, P10 is a theoretical number of steps in transferring the paper from said first sensor to said second sensor without the slippage and, S20 is a theoretical transfer distance of the paper from said second sensor to said reading means without the slippage.

* * * * *